(12) United States Patent
Hendricks et al.

(10) Patent No.: US 10,196,098 B2
(45) Date of Patent: Feb. 5, 2019

(54) VEHICLE AND A SYSTEM FOR OPERATING A WORK IMPLEMENT OF A VEHICLE

(71) Applicant: Brush Hawg, LLC, Easley, SC (US)

(72) Inventors: Timothy E. Hendricks, Easley, SC (US); Philip L. Hendricks, Easley, SC (US)

(73) Assignee: Iron Container, LLC, Tampa, FL (US)

( * ) Notice: Subject to any disclaimer, the term of this patent is extended or adjusted under 35 U.S.C. 154(b) by 193 days.

(21) Appl. No.: 15/080,925

(22) Filed: Mar. 25, 2016

(65) Prior Publication Data

US 2017/0137072 A1    May 18, 2017

Related U.S. Application Data

(60) Provisional application No. 62/254,245, filed on Nov. 12, 2015.

(51) Int. Cl.
*B60P 1/54* (2006.01)
*B62D 33/06* (2006.01)
*B60N 2/01* (2006.01)

(52) U.S. Cl.
CPC .............. *B62D 33/06* (2013.01); *B60N 2/01* (2013.01); *B60P 1/5423* (2013.01)

(58) Field of Classification Search
CPC ...... B60P 1/5423; B60P 1/5428; B60P 1/5433
See application file for complete search history.

(56) References Cited

U.S. PATENT DOCUMENTS

| | | | | |
|---|---|---|---|---|
| 3,800,966 A | * | 4/1974 | Newton | B66C 3/20 280/423.1 |
| 3,876,095 A | * | 4/1975 | Stedt | B60P 1/5433 296/200 |
| 4,012,069 A | * | 3/1977 | Carson | B66C 3/16 294/106 |
| 4,373,856 A | * | 2/1983 | Taylor | B60F 1/043 105/215.2 |
| 4,436,177 A | * | 3/1984 | Elliston | B62D 33/0612 180/324 |
| 4,552,501 A | * | 11/1985 | Clark | A01D 90/08 280/754 |
| 5,490,755 A | * | 2/1996 | Billotte | B60K 17/14 180/24.03 |

(Continued)

*Primary Examiner* — Jonathan Snelting
(74) *Attorney, Agent, or Firm* — Dority & Manning, P.A.

(57) ABSTRACT

A vehicle is provided. In one embodiment, the vehicle includes a work implement and a cab positioned forward of the work implement. The cab defines a cab interior that includes a vehicle operator portion, an implement operator portion defined rearward of the vehicle operator portion, and an implement operator seat positioned in the implement operator portion that is configured to face rearward toward the work implement. In another embodiment, the vehicle includes a work implement; a cab positioned forward of the work implement; a vehicle operator seat mounted within the cab that faces a front of the vehicle; an implement operator seat mounted within the cab rearward of the vehicle driver seat and that faces a rear of the vehicle; and one or more controls mounted proximate the implement operator seat that are configured for operating the work implement. A system for operating a work implement also is provided.

20 Claims, 4 Drawing Sheets

FIG. -1-

(56) References Cited

U.S. PATENT DOCUMENTS

| | | | |
|---|---|---|---|
| 6,325,449 B1 | 12/2001 | Sorensen et al. | |
| 6,409,457 B1 * | 6/2002 | Korycan | B60P 1/167 180/242 |
| 7,353,652 B2 | 4/2008 | Osburn | |
| 7,866,934 B2 * | 1/2011 | Osburn | B60P 1/548 414/478 |
| 8,272,467 B1 * | 9/2012 | Staab | E02F 9/26 172/2 |
| 9,579,994 B2 * | 2/2017 | Muehlbauer | B60N 2/143 |
| 9,871,968 B2 * | 1/2018 | Husted | H04N 5/23238 |
| 2008/0279666 A1 | 11/2008 | Rathbun et al. | |
| 2009/0116947 A1 * | 5/2009 | Piccioni | B25J 3/04 414/732 |
| 2015/0176249 A1 | 6/2015 | McKee et al. | |

* cited by examiner

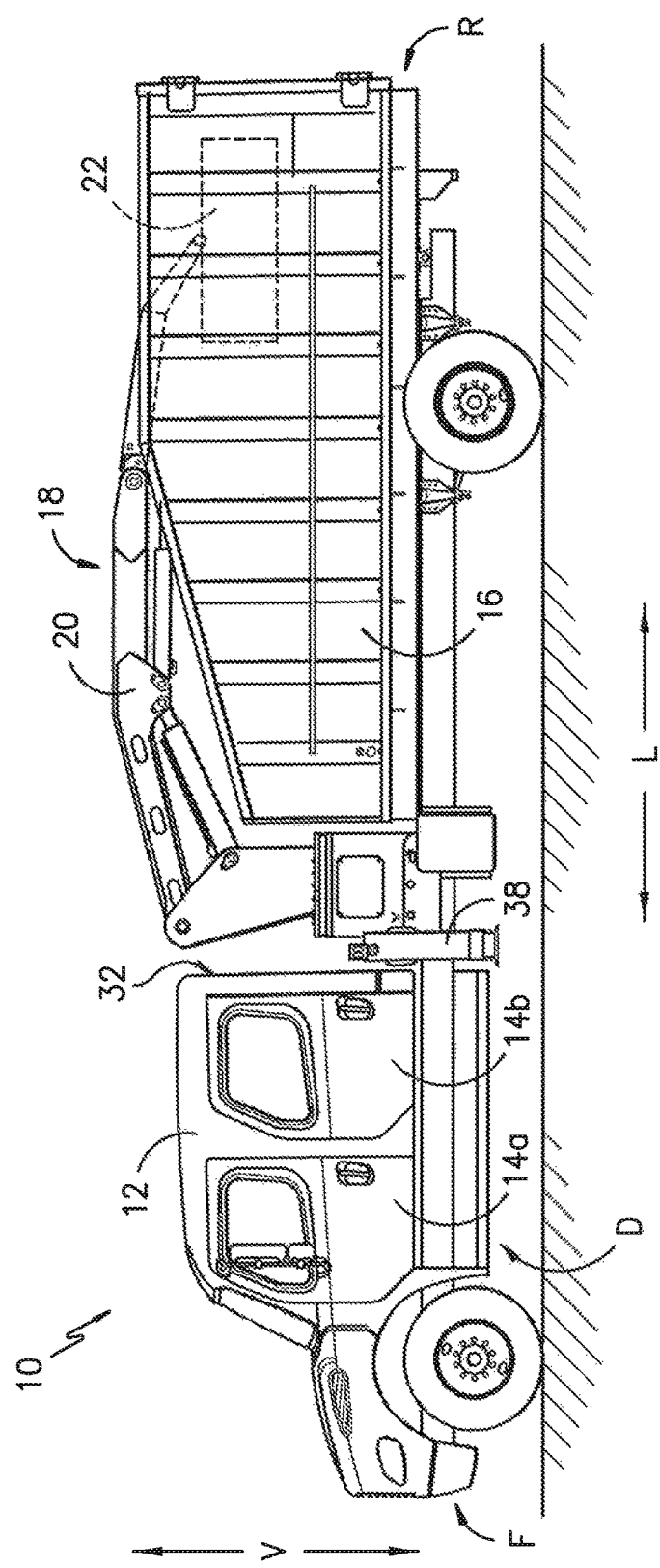
FIG. -1-

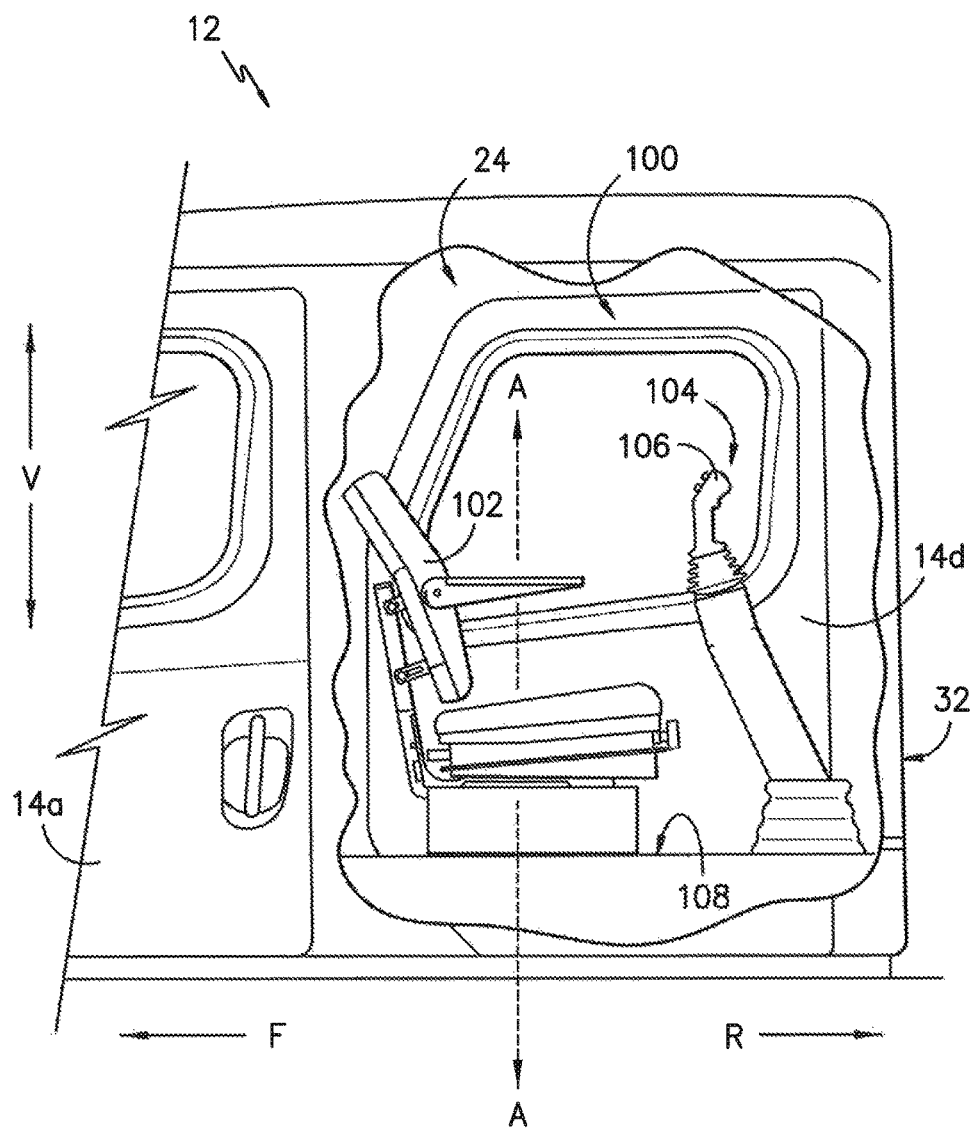
FIG. -2-

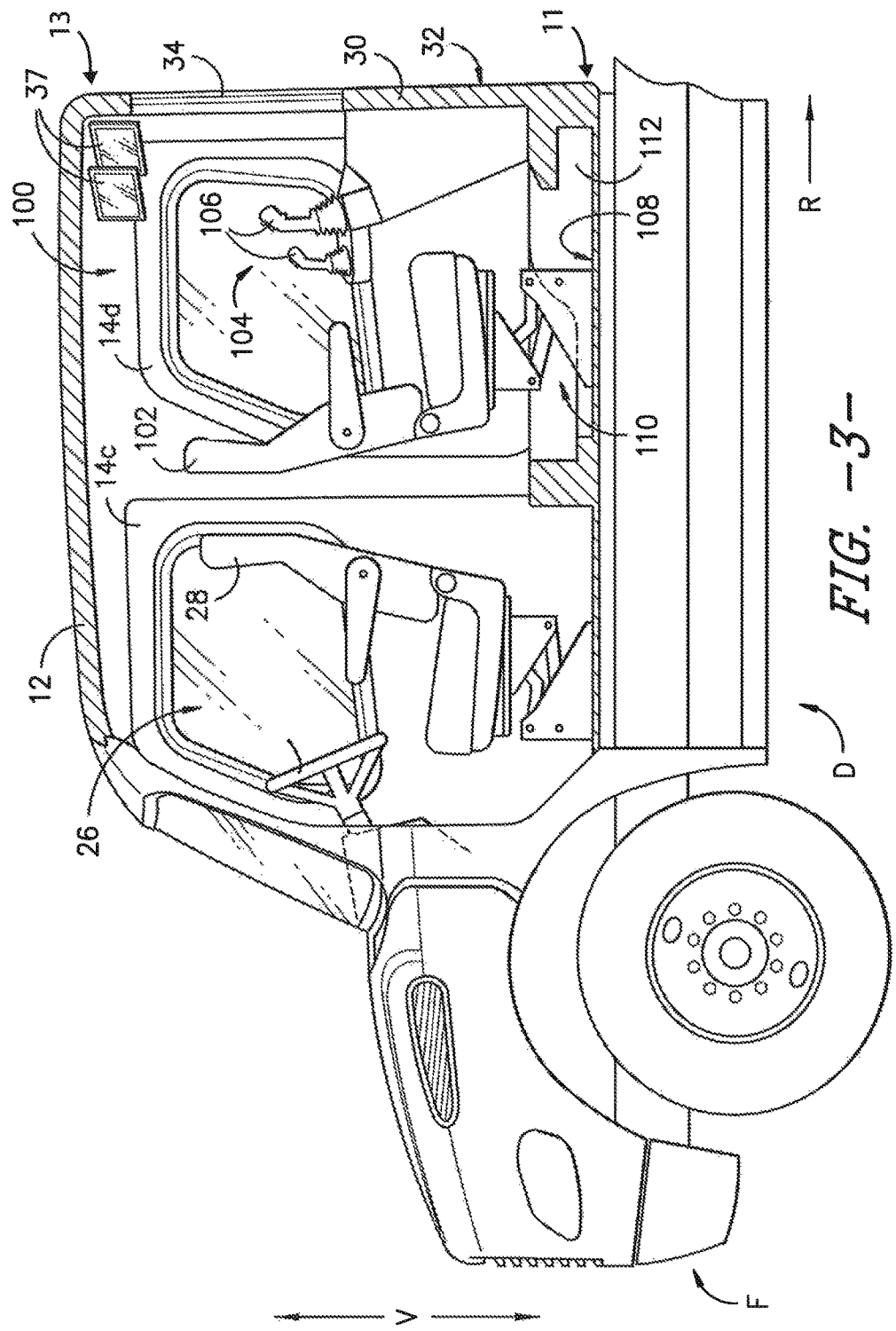
FIG. -3-

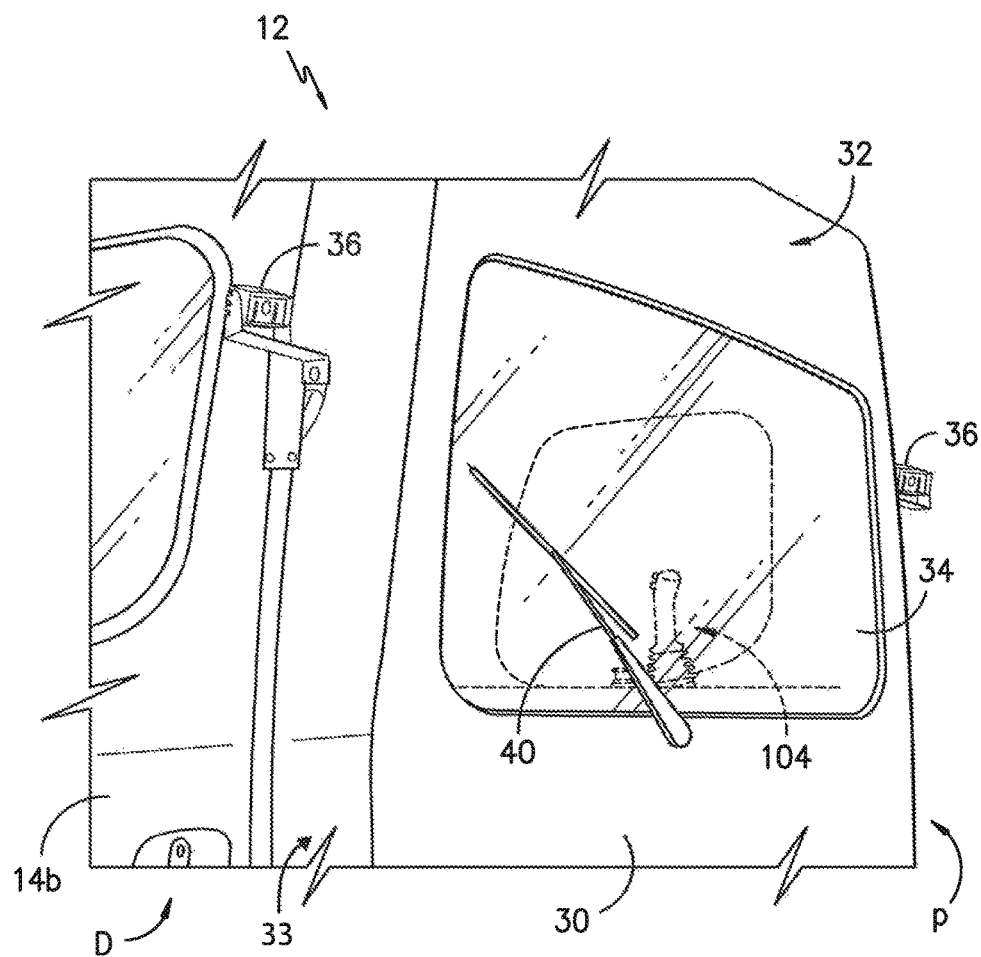
FIG. -4-

VEHICLE AND A SYSTEM FOR OPERATING A WORK IMPLEMENT OF A VEHICLE

RELATED APPLICATIONS

The present application claims priority to U.S. Provisional Application Ser. No. 62/254,245, filed on Nov. 12, 2015, which is incorporated herein in its entirety by reference thereto.

FIELD OF THE INVENTION

The subject matter of the present disclosure relates generally to an apparatus or system for operating a work implement of a vehicle. More particularly, the present subject matter relates to a vehicle having a work implement operable from within the vehicle.

BACKGROUND OF THE INVENTION

Typically, work implements mounted to or included as part of a vehicle such as a truck are operated by an operator standing or seated outside of the vehicle. For example, the grapple of a vehicle having a grapple loader usually is operated by an operator manipulating one or more controls outside of a cab of the vehicle. However, operating the grapple loader or another work implement outside of the vehicle can pose safety hazards or risks to the operator or can be inconvenient to the operator, e.g., when operating the grapple loader in cold, rainy, or hot weather. Further, the operator's field of view may be restricted or impeded when operating the work implement from outside the vehicle. That is, operating the work implement outside the vehicle may not provide the best field of view for the operator, e.g., when the operator must stand on one side of the vehicle but the work zone of the implement extends to both sides of the vehicle. Therefore, operating a work implement of a vehicle from outside the vehicle can pose safety hazards or risks and inconveniencies to the operator, as well as other people and objects within the work zone of the work implement.

Accordingly, an apparatus and/or system for operating a work implement from inside a vehicle would be useful. In particular, a vehicle having a work implement and a cab that includes an implement operator seat with the cab that is configured to face the work implement would be desirable. More specifically, a vehicle having a work implement that includes a rear-facing seat within a cab of the vehicle and further includes controls for operating a work implement, e.g., a grapple and/or outriggers, that is outside of the vehicle would be advantageous. Also, a system for operating a work implement of a vehicle would be beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a vehicle is provided. The vehicle has a front and a rear, and the front and rear are spaced apart along a longitudinal direction. The vehicle includes a work implement and a cab positioned forward of the work implement. The cab defines a cab interior. The cab interior includes a vehicle operator portion, an implement operator portion defined rearward of the vehicle operator portion, and an implement operator seat positioned in the implement operator portion. The implement operator seal is configured to face rearward toward the work implement.

In a further exemplary embodiment of the present disclosure, a vehicle is provided. The vehicle has a front and a rear, and the front and rear are spaced apart along a longitudinal direction. The vehicle includes a work implement; a cab positioned forward of the work implement; and a vehicle operator seat mounted within the cab. The vehicle operator seat faces the front of the vehicle. The vehicle further includes an implement operator seat mounted within the cab rearward of the vehicle operator seat. The implement operator seat faces the rear of the vehicle. The vehicle also comprises one or more controls mounted proximate the implement operator seat. The controls are configured for operating the work implement.

In another exemplary embodiment of the present disclosure, a system for operating a work implement of a vehicle is provided. The system includes a work implement mounted toward a rear of the vehicle and an implement operator seat facing the rear of the vehicle. The implement operator seat is mounted within a cab of the vehicle forward of the work implement. The system further includes one or more controls mounted proximate the implement operator seat, the controls configured for operating the work implement.

Further, features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a vehicle according to an exemplary embodiment of the present subject matter, the vehicle having a grapple loader for loading items into a bed, container, dump body, or the like mounted on or to the vehicle.

FIG. 2 is a partial cutaway view of a rear portion of a cab of the vehicle of FIG. 1 according to an exemplary embodiment of the present subject matter.

FIG. 3 is a partial cross-section view of the cab of the vehicle of FIG. 1 according to an exemplary embodiment of the present subject matter.

FIG. 4 is a perspective view of a rear exterior portion of the cab of the vehicle of FIG. 1 according to an exemplary embodiment of the present subject matter.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

Referring now to the drawings, wherein identical numerals indicate the same elements throughout the figures, FIG. 1 is a side view of a vehicle having a work implement; in particular, the depicted vehicle has a grapple loader for loading items into a bed or container mounted on or to the vehicle. As depicted in FIG. 1, the vehicle 10 includes a cab 12 having two doors 14 on a driver side D of the vehicle. Similarly, vehicle 10 may also have a passenger side P (FIG. 4) opposite driver side D, and two doors 14 may be mounted on or to passenger side P (FIG. 3). Thus, vehicle 10 may be a four-door vehicle. Further, doors 14 mounted on driver side D of cab 12 may be spaced apart along a longitudinal direction L defined by vehicle 10. More particularly, in the embodiment shown in FIG. 1, a front first door 14a is mounted closer to a front F of vehicle 10, and a rear second door 14b is mounted closer to a rear R of vehicle 10, i.e., second door 14b is mounted rearward of first door 14a. Moreover, as will be readily appreciated, the exemplary embodiment of vehicle 10 shown in FIG. 1 is a truck that is operable on roads, highways, and other motorways. That is, vehicle 10 complies with applicable rules, regulations, and laws such that it may be operated on roads, highways, and the like. However, although described with respect to the exemplary embodiments shown in the figures, it should be understood that vehicle 10 may have other configurations as well.

Vehicle 10 further defines a vertical direction V that is orthogonal to the longitudinal direction L. Referring still to FIG. 1, vehicle 10 includes a bed or dump body 16 extending along the longitudinal direction L and vertical direction V and defining rear R of vehicle 10. A work implement 18 is mounted between cab 12 and dump body 16. More specifically, cab 12 is positioned forward of work implement 18 such that work implement 18 is mounted toward the rear R of vehicle 10 relative to cab 12. In the depicted embodiment, work implement 18 is a grapple loader including a boom 20 and a grapple 22. As shown in FIG. 1, boom 20 may have multiple portions or segments, such as a main boom and a tip boom. Grapple loader 18 may be operated, e.g., to pick up items such as limbs, brush, or other debris and lift the items into dump body 16. Vehicle 10 may be used to transport the items placed in dump body 16 using grapple loader 18, e.g., to dispose of the items or to otherwise unload the items in a location away or removed from where the items were loaded into dump body 16. In other embodiments, work implement 18 may be an implement such as a bucket or the like, and in still other embodiments, work implement 18 may be any other suitable implement for performing tasks and/or work, such as implements that may be useful when included as part of vehicle 10.

Referring now to FIG. 2, a partial cutaway view is shown of a rear portion of cab 12. As shown, cab 12 defines a cab interior 24 that includes a vehicle operator portion 26 and an implement operator portion 100. Preferably, implement operator portion 100 is defined with the cab interior rearward of vehicle operator portion 26. It will be understood that in embodiments in which work implement 18 is a grapple loader or a bucket, implement operator portion 100 also may be referred to as grapple operator portion 100 or bucket operator portion 100, respectively.

Vehicle operator portion 26 may include, e.g., a vehicle operator or driver seat 28 (FIG. 3) mounted therein that faces the front F of vehicle 10, as well as a steering wheel 29 (FIG. 3), gas and brake pedals, gear shift, and/or other such controls for operating or driving vehicle 10. Implement operator portion 100 of the interior 24 of cab 12 includes a rear-facing implement operator seat 102 and controls 104 for operating work implement 18. As illustrated in FIG. 3, implement operator seat 102 is mounted within implement operator portion 100 rearward of vehicle operator seat 28 and is configured to face rearward toward work implement 18. Therefore, an operator can operate work implement 18 from within cab 12, and the operator may operate the implement from a seated position.

Moreover, it will be appreciated that both vehicle operator portion 26 and implement operator portion 100 may be provided within the same cab 12, as is most clearly illustrated in FIG. 3. Accordingly, as appropriate, both a vehicle operator or driver and an implement operator (e.g., if one person is not both the driver and the implement operator) may be housed or accommodated within cab 12, even when the implement operator is in position to operate implement 18.

As shown in FIGS. 2 and 3, controls 104 are mounted proximate implement operator seat 102 and may include, e.g., one or more joysticks 106 that may be manipulated by the implement operator to control the operation of work implement 18. Joysticks 106 may be air controlled or, in other embodiments, joysticks 106 may be electronically controlled. In still other embodiments, a combination of air controlled and electronically controlled joysticks 106 may be used. Controls 104 may include other types of controls as well, such as one or more buttons, levers, switches, or the like. Further, although shown in FIG. 2 as supported by or on a floor 108 defined at a lower portion 11 of cab 12, in other embodiments controls 104 may be placed in other locations within implement operator portion 100 and may be supported by or on other portions of cab 12. For example, as shown in FIG. 3. one or more controls 104 may be supported by or on a rear wall 30 of cab 12.

In some embodiments, a cab 12 of a typical four-door vehicle, such as a four-door truck, may be modified to include implement operator portion 100. That is, known configurations of four-door vehicles may include a front-facing seat in the rearward portion of interior 24 of cab 12. The front-facing seat is removed and floor 108 of cab 12 re-configured or modified as needed to mount rear-facing seat 102 within cab 12. For example, in a typical four-door vehicle, a bench seat or other type of front-facing seat may extend or be positioned over floor 108 such that the contours (e.g., from wheel wells, etc.) and/or position of floor 108 do not affect the use of the seat, i.e., sufficient room remains forward of the seat to accommodate a person's legs and feet. However, when cab 12 includes implement operator portion 100, an operator seated in rear-facing seat 102 will have his or her legs and feet positioned near or adjacent rear wall 30 of cab 12. Thus, as shown generally at 110 in FIG. 3, floor 108 of vehicle 10 may be configured to provide foot and/or leg room for an operator seated in seat 102. In some embodiments, floor 108 may define one or more recesses 112 to provide footroom for an operator. As illustrated, recesses 112 are defined rearward of implement operator seat 102 adjacent rear wall 30 of cab 12 to accommodate an operator's feet when the operator is seated in seat 102 and facing the rear R of vehicle 10. Additionally or alternatively, floor 108 may be configured to provide support for and/or a place to mount rear-facing seat 102, i.e., floor 108 may be configured for mounting rear-facing implement operator seat 102 in the implement operator portion 100 defined at the rear of cab 12. Floor 108 also may include other features for accommodating implement operator seat 102 and an implement operator.

Further, although shown as accessible through rear doors 14b and 14d, rear-facing seat 102 also may be accessible from a front portion of cab 12, e.g., through front first door 14a of driver side D or front third door 14c of passenger side P. A front door generally is a door closer to the front F of vehicle 10 along the longitudinal direction L than implement operator portion 100 of cab 12, i.e., front doors 14a, 14c are mounted forward of implement operator portion 100 of cab 12. Thus, an implement operator may enter vehicle 10 through a front door (e.g. first door 14a or third door 14c) such that the operator is in vehicle operator portion 26 of cab 12, and then the implement operator may move into implement operator portion 100 of cab 12, e.g., by stepping, walking, or otherwise moving between front-facing seats in vehicle operator portion 26 to access implement operator portion 100.

Rear-facing seat 102 may include one or more features for adjusting a height of the seat, i.e., the position of seat 102 along the vertical direction V, and/or for adjusting the position of seat 102 along the longitudinal direction L. Rear-facing seat 102 also may include one or more features for swiveling or rotating seat 102 about an axis A that extends along the vertical direction V. That is, in some embodiments, implement operator seat 102 may be rotatable between a rear-facing position and a forward-facing position. Thus, in such embodiments, implement operator seat 102 may be rotated to the rear-facing position when an implement operator is seated in seat 102 to operate implement 18 and seat 102 may be rotated to the front-facing position when the vehicle is being driven. Implement operator seat 102 also may include features for locking or securing seat 102 in a selected position, e.g., for locking or securing the seat at a selected vertical, longitudinal, and rotational position.

Additionally, one or more sensors, such as cameras or other optical devices, may be mounted within or outside of cab 12, e.g., along an outer rear surface 32 of cab 12, on work implement 18 (e.g., on boom 20 and/or on grapple 22), on dump body 16, and/or on other portions of vehicle 10. The sensors may provide various information about work implement 18, e.g., its position, its status, etc. As shown in the exemplary embodiment of FIG. 4, two cameras 36 are mounted to an exterior 33 of cab 12, one camera 36 on driver side D and another camera 36 on passenger side P, to provide images of a work zone of implement 18. Referring to FIG. 3, one or more displays 37 mounted within implement operator portion 100 proximate implement operator seat 102 may provide the implement operator with feeds or outputs from the sensors, e.g., the images from cameras 36, to help the operator maneuver or otherwise operate work implement 18. That is, displays 37 are for displaying to the operator outputs from the one or more sensors. For example, in the embodiment depicted in FIG. 3, two displays 37 are mounted to an upper portion 13 of cab 12 within implement operator portion 100. Each display 37 may receive one or more outputs from a single sensor or multiple sensors, e.g., one display 37 may display the output from one camera 36 and one display 37 may display the output from another camera 36. In another embodiment, one camera 36 may be mounted to one side of cab 12, another camera 36 may be mounted to another side of cab 12, and a third camera 36 may be mounted to implement 18, and the images from the three cameras may be provided to one or more displays 37 that are within implement operator portion 100 and within the view of the operator. It will be understood that other types and numbers of sensors also may be used to help the operator operate implement 18.

Moreover, as depicted in FIGS. 3 and 4, cab 12 defines a rear window 34 configured to provide the implement operator with a view of work implement 18 and its area of operation, i.e., its work zone, to help the operator operate the implement. That is, window 34 provides for viewing implement 18, as well as its work zone, from cab interior 24. In the depicted exemplary embodiment, rear wall 30 of cab 12 defines rear window 34. Window 34 may be configured to optimize the operator's field of view and the operator's ability to view work implement 18 (e.g., boom 20 and grapple 22) and dump body 16. As an example, where implement 18 is a grapple loader, window 34 permits the grapple loader operator to view the items to be picked up by grapple 22 and any elements within the work zone of grapple loader 18, e.g., dump body 16 and/or people working in the vicinity of grapple loader 18, as well as other elements that the operator should avoid contacting with grapple 22 and/or boom 20. As such, rear window 34 may be wider and taller than in known vehicle configurations, i.e., rear window 34 may extend farther along the vertical direction V, as well as a width of cab 12, than typical vehicle rear windshields. Moreover, features such as, e.g., a windshield wiper 40, may be provided to help keep the operator's viewing area clear from obstructions, such as water, debris, or the like, that could hinder the operator's view during operation of work implement 18.

Of course, it will be appreciated that vehicle 10 may include other mechanisms in addition to or as alternatives to work implement 18 that are operable from implement operator portion 100. For example, vehicle 10 may include one or more stabilizers 38 (FIG. 1) or the like for stabilizing vehicle 10 during operation of work implement 18 that may be operated from implement operator portion 100 of vehicle 10, e.g., using controls 104. In some embodiments, vehicle 10 may include one stabilizer 38 on each of driver side D and passenger side P of the vehicle.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A vehicle, the vehicle having a front and a rear, the front and rear spaced apart along a longitudinal direction, the vehicle comprising:
   a bed for the placement of items therein to be transported by the vehicle;
   a work implement mounted forward of the bed;
   a cab positioned forward of the work implement such that the work implement is mounted between the cab and the bed, the cab defining a cab interior and having an exterior, the cab interior including
      a vehicle operator portion,
      an implement operator portion defined rearward of the vehicle operator portion, and an implement operator seat positioned in the implement operator portion, the implement operator seat configured to face rearward toward the work implement, wherein at least one camera is mounted to a driver's side of the exterior or a passenger's side of the exterior, the at least one camera oriented toward a work zone of the work implement.

2. The vehicle of claim 1, further including one or more controls mounted proximate the implement operator seat, the controls configured for operating the work implement.

3. The vehicle of claim 2, wherein the one or more controls are supported by a rear wall of the cab.

4. The vehicle of claim 1, wherein the cab includes a rear wall, and wherein the rear wall defines a window for viewing the work implement from the implement operator seat such that an operator can view through the window the work implement and the work zone while seated in the implement operator seat.

5. The vehicle of claim 1, wherein the cab interior further includes one or more displays for displaying outputs from the at least one camera.

6. The vehicle of claim 1, wherein the cab includes a floor at a lower portion thereof, the floor of the cab defining a recess that provides footroom for an operator of the work implement.

7. The vehicle of claim 1, wherein the work implement is a grapple loader.

8. The vehicle of claim 1, wherein the implement operator seat is adjustable along the longitudinal direction and a vertical direction defined by the vehicle, wherein the implement operator seat is rotatable between a forward-facing position and a rearward-facing position, and wherein the implement operator seat is securable in a selected vertical, longitudinal, and rotational position.

9. A vehicle, the vehicle having a front and a rear, the front and rear spaced apart along a longitudinal direction, the vehicle comprising:
   a bed for the placement of items therein to be transported by the vehicle;
   a work implement mounted forward of the bed;
   a cab positioned forward of the work implement such that die work implement is mounted between the cab and the bed;
   a vehicle operator seat mounted within the cab, the vehicle operator seat facing the front of the vehicle;
   an implement operator seat mounted within the cab rearward of the vehicle operator seat, the implement operator seat being adjustable between a first position facing the front of the vehicle and a second position facing the rear of the vehicle;
   one or more controls mounted proximate the implement operator seat, the controls configured for operating the work implement; and
   a first camera mounted to a driver's side of an exterior of the cab and a second camera mounted to a passenger's side of the exterior.

10. The vehicle of claim 9, wherein the cab defines a cab interior having a vehicle operator portion and an implement operator portion, and wherein the vehicle operator seat is mounted within the vehicle operator portion and the implement operator seat is mounted within the implement operator portion.

11. The vehicle of claim 9, wherein the one or more controls are supported by a rear wall of the cab.

12. The vehicle of claim 9, wherein the cab includes a rear wall, wherein the rear wall defines a window for viewing the work implement from within the cab, and wherein the first camera is mounted on the driver's side adjacent the window and the second camera is mounted on the passenger's side adjacent the window.

13. The vehicle of claim 9, further including one or more displays for displaying outputs from the first and second cameras, the displays mounted within the cab proximate the implement operator seat.

14. The vehicle of claim 9, wherein the floor of the cab is configured for mounting the implement operator seat in a rear portion of the cab.

15. A system for operating a work implement of a vehicle, the system comprising:
   a bed for the placement of items therein to be transported by the vehicle;
   a work implement mounted forward of the bed;
   an implement operator seat being adjustable between a first position facing the front of the vehicle and a second position facing the rear of the vehicle, the implement operator seat mounted within a cab of the vehicle forward of the work implement such that the work implement is mounted between the cab and the bed;
   one or more controls mounted proximate the implement operator seat, the controls configured for operating the work implement; and
   a first camera mounted to a driver's side of an exterior of the cab and a second camera mounted to a passenger's side of the exterior, the first and second cameras oriented toward a work zone of the work implement.

16. The system of claim 15, further comprising one or more sensors that provide information about the work implement.

17. The system of claim 16, further comprising one or more displays for displaying outputs from the one or more sensors and the first and second cameras, the one or more displays mounted proximate the implement operator seat.

18. The system of claim 17, wherein the one or more displays are mounted to an upper portion of the cab such that the one or more displays are viewable from the implement operator seat.

19. The system of claim 15, wherein the work implement is a grapple loader.

20. The system claim 15, wherein the vehicle is a truck.

* * * * *